United States Patent
Gutberlet et al.

[11] Patent Number: 6,042,724
[45] Date of Patent: Mar. 28, 2000

[54] WATER TREATMENT APPARATUS AND PURIFICATION PROCESS USING THE WATER

[75] Inventors: Wolfgang Gutberlet, Dipperz; Eckhard Schlinzig, Eitorf; Walter Maier, Weissenbronn, all of Germany

[73] Assignee: Herzberger Backerei GmbH, Fulda, Germany

[21] Appl. No.: 09/093,885

[22] Filed: Jun. 9, 1998

[30] Foreign Application Priority Data

Jun. 20, 1997 [DE] Germany .......................... 197 26 114
Jul. 3, 1997 [DE] Germany .......................... 197 28 400

[51] Int. Cl.[7] ................................................. B01D 35/00
[52] U.S. Cl. ........................... 210/199; 210/255; 261/125
[58] Field of Search ..................... 210/199, 205, 210/255, 150, 151, 176, 175; 261/125

[56] References Cited

U.S. PATENT DOCUMENTS

| | | | |
|---|---|---|---|
| 2,356,405 | 8/1944 | Hermes | 210/255 |
| 5,069,885 | 12/1991 | Ritchie | 210/748 |
| 5,130,094 | 7/1992 | Eberts | 210/255 |
| 5,714,062 | 2/1998 | Winkler et al. | 210/220 |

FOREIGN PATENT DOCUMENTS

| | | |
|---|---|---|
| 584696 | 10/1933 | Germany . |
| 1 171 831 | 6/1964 | Germany . |
| 24 05 233 | 8/1975 | Germany . |
| 30 08 725 | 9/1984 | Germany . |
| 1486286 | 9/1977 | United Kingdom . |

Primary Examiner—David A. Simmons
Assistant Examiner—Frank M. Lawrence
Attorney, Agent, or Firm—Evenson, McKeown, Edwards & Lenahan, PLLC

[57] ABSTRACT

In a water treating apparatus the water is passed over a plurality of stages to a lower plane, each stage having a water trough, a section for the free fall of the water, and a catch. This makes possible the intensive mixing of the water with components of the air, especially oxygen and amino acids, as well as the action of natural light radiation onto the water.

8 Claims, 4 Drawing Sheets

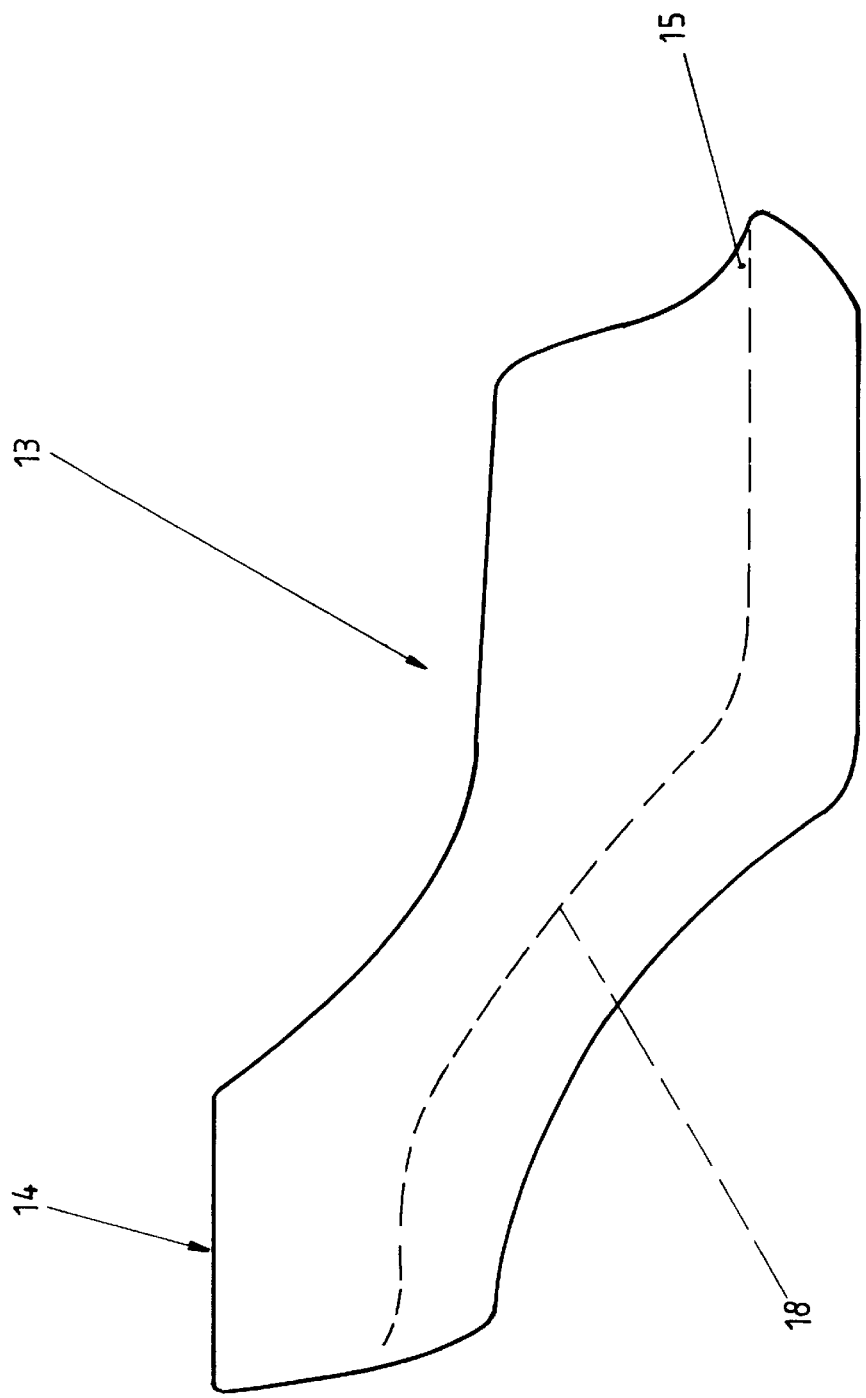

WATER TREATMENT APPARATUS AND PURIFICATION PROCESS USING THE WATER

BACKGROUND AND SUMMARY OF THE INVENTION

This application claims the priority of German Patent Applications 197 26 114.0 and 197 28 400.0, filed Jun. 20, 1997 and Jul. 3, 1997, respectively.

The invention relates to a water treatment apparatus, especially for the production of foods, which has at least one section configured for the free fall of water under the effect of gravity and at least one device for catching the water.

An apparatus of the above-described kind is described in German Published Patent Application 24 05 233. In the apparatus of this patent, water free falls from an outlet slot of a waterfall cascade against a plate of the next lower cascade level. The apparatus is not intended for treating water for food production.

An apparatus for treating water for food manufacture is described in German Published Patent Application DE 42 15 637 A1. The use of water treated in such an apparatus in the preparation of foods increases food stability, among other things. According to this patent, an apparatus for mixing water with components of air is made of an apparatus for agitating the water, and a tank containing the water. In the tank, the water is swirled, preferably for two minutes, and preferably on a lemniscate path.

A disadvantage in this apparatus is the need for energy for agitating the water, which substantially diminishes its economy of use. Also, the amount of time required for agitating the water is a hindrance because as a result, the apparatus operates discontinuously. Furthermore, due to the need for agitation, the apparatus must be designed with a relatively large tank, and is therefore expensive to manufacture and requires regular maintenance.

It is an object of the present invention to deliver water in any amount continuously treated in the above manner, so that the water has a positive effect on foods obtained from production with the water, without additional expenditures of energy.

This object is achieved by providing a free fall apparatus wherein the free fall of water is preceded by an open-surface water trough carrying the water from a higher level to a lower level.

In contrast to the treatment apparatus with the tank that requires shaking, the apparatus of the present invention requires substantially less energy since water moves solely by the effect of gravity. The treatment apparatus according to the present invention requires no moving parts and therefore no drive means. For this reason, it operates substantially free of wear and needs no maintenance.

In contrast to the previously known treatment apparatuses, the treatment apparatus of the present invention can operate continually, so that it is suitable for the treatment of greater amounts of water. Moreover, the treatment apparatus of the present invention can be built more compactly than a comparable apparatus of equal output.

Components taken from air while water is flowing in the apparatus are distributed very evenly if the water trough has a rough surface. Even distribution makes it possible for the components to remain in the water for a relatively long time, so that the water can be stored before being used in food preparation. Granite is especially desirable as the material for the water troughs because it can heat the water.

The reasons for the advantageous properties of the water treated with the apparatus of the present invention have not been completely explained. However, an increase in the oxygen content of the water is no doubt important. Also, water enrichment with amino acids present in ambient air may be important. Water treated with the apparatus of the present invention is also well suited for other foods, such as beverages and ice cream, and especially well suited for baking dough.

Food preparation can benefit, especially if the water used is exposed to natural light; while flowing through the troughs, water can absorb the radiant energy of the light. According to an embodiment of the present invention, this can be accomplished if the housing is made of transparent material and the troughs are made of a thermal energy storing material. Surprisingly it has been found that water treated in such an apparatus retains its desirable properties substantially longer than water that has been treated in a closed tank driven around a lemniscate path. Also, desirable properties of the water are not lost by pumping the water. Although natural light has an effect that is advantageous in the treatment of the water, it has also been found advantageous to draw the water from the apparatus at night.

The apparatus of the present invention operates far more effectively than the known water treatment apparatus, since the water can flow over open water troughs. The water treated in the apparatus is protected against contamination by the environment, but it is always supplied with fresh air if it has a ventilated housing.

In a preferred embodiment, the water treatment apparatus will have successive water troughs followed by a section for free fall. As such, before the free fall of water, a trough is available to smooth its flow.

If flow forms are disposed in the treatment apparatus, the components of air taken up by the water are evenly distributed in the water by agitating the water.

Water of the present invention may be used for cleaning floors, equipment, dishes, laundry or the like. Surprisingly, it has been found that such water dissolves dirt substantially better than untreated water, so that the need for cleaning agents, as additives to the water, is substantially reduced or can even be eliminated entirely. Even baking pans from bakeries can be cleaned with the pretreated water. It has also been found that, after cleaning, solids in the residual dirty water settle in and can be separated from the water more easily than in untreated water.

Other objects, advantages and novel features of the present invention will become apparent from the following detailed description of the invention when considered in conjunction with the accompanying drawings.

BRIEF DESCRIPTION OF THE DRAWINGS

FIG. 4 is a side view of the flow form.

DETAILED DESCRIPTION OF THE DRAWINGS

Figure 1:
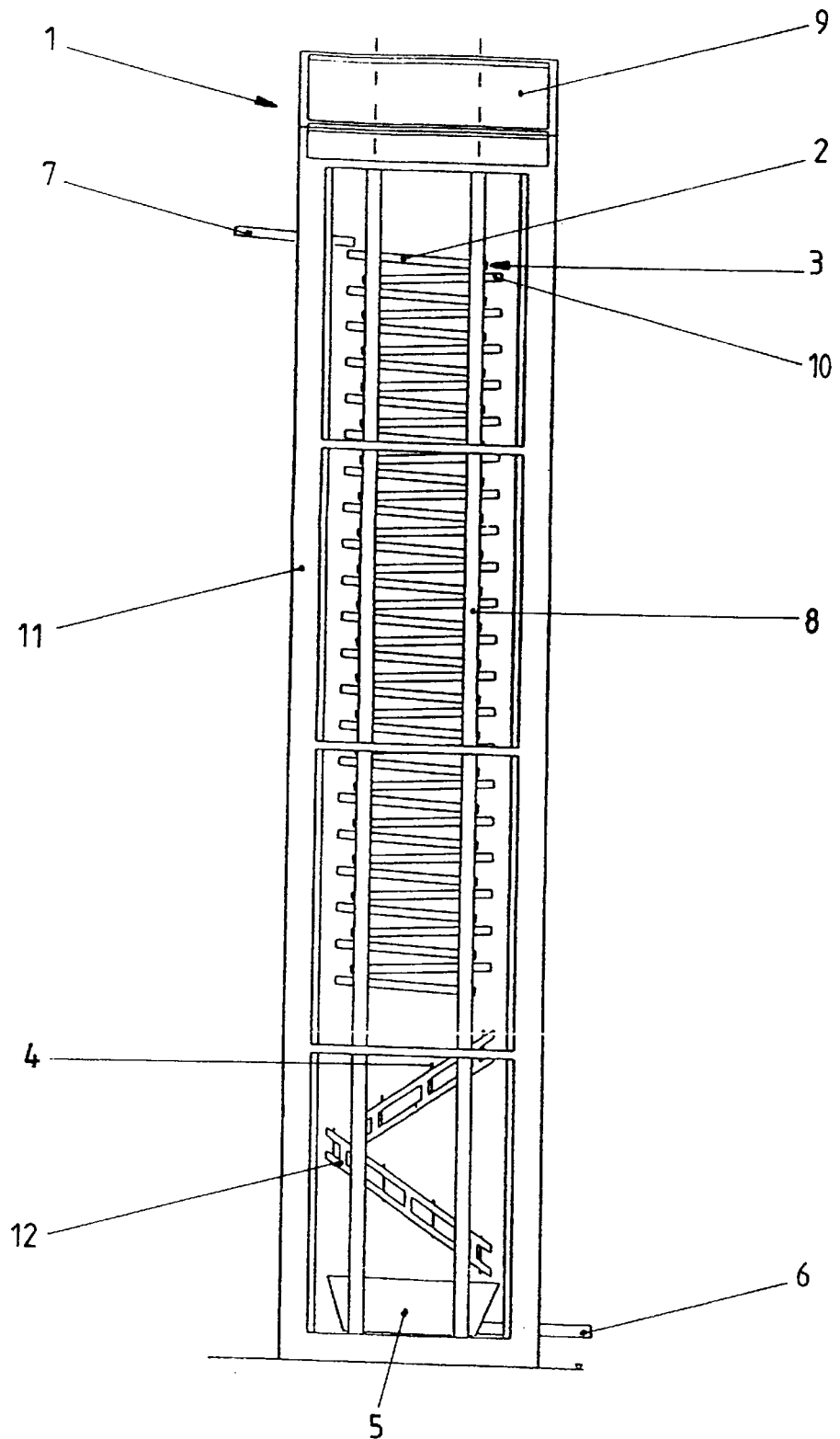
FIG. 1 is a vertical section through a treatment apparatus of the invention.

FIG. 1 shows a treatment apparatus 1 with an inclined water trough 2 configured for carrying the water, with a following section 3 for the free fall of the water, and a catcher 10. This is followed by a water trough reversing the direction of flow, so that the treatment apparatus consists of a plurality of successive stages held by a frame 8. The water to be treated passes through a spout 7 into the water trough 2 and then flows on through a system of additional water troughs, sections in which the water falls free, and catchers, into an area lower down in the tower-like arrangement. There the water enters into a section in which the treatment apparatus 1 has a holder 12 with a flow form rack 4. A flow form, which is not shown in the drawing for better clarity, is further described in FIGS. 3 and 4. On the bottommost level of the treatment apparatus is a catch basin 5 in which the water thus treated is collected. The water passes out through a spout 6 for further use. A housing 11 with inserted glass plates, not shown, serves to protect against undesirable environmental influences. At the upper end, a ventilation shutter 9 is provided for better ventilation.

Figure 2:
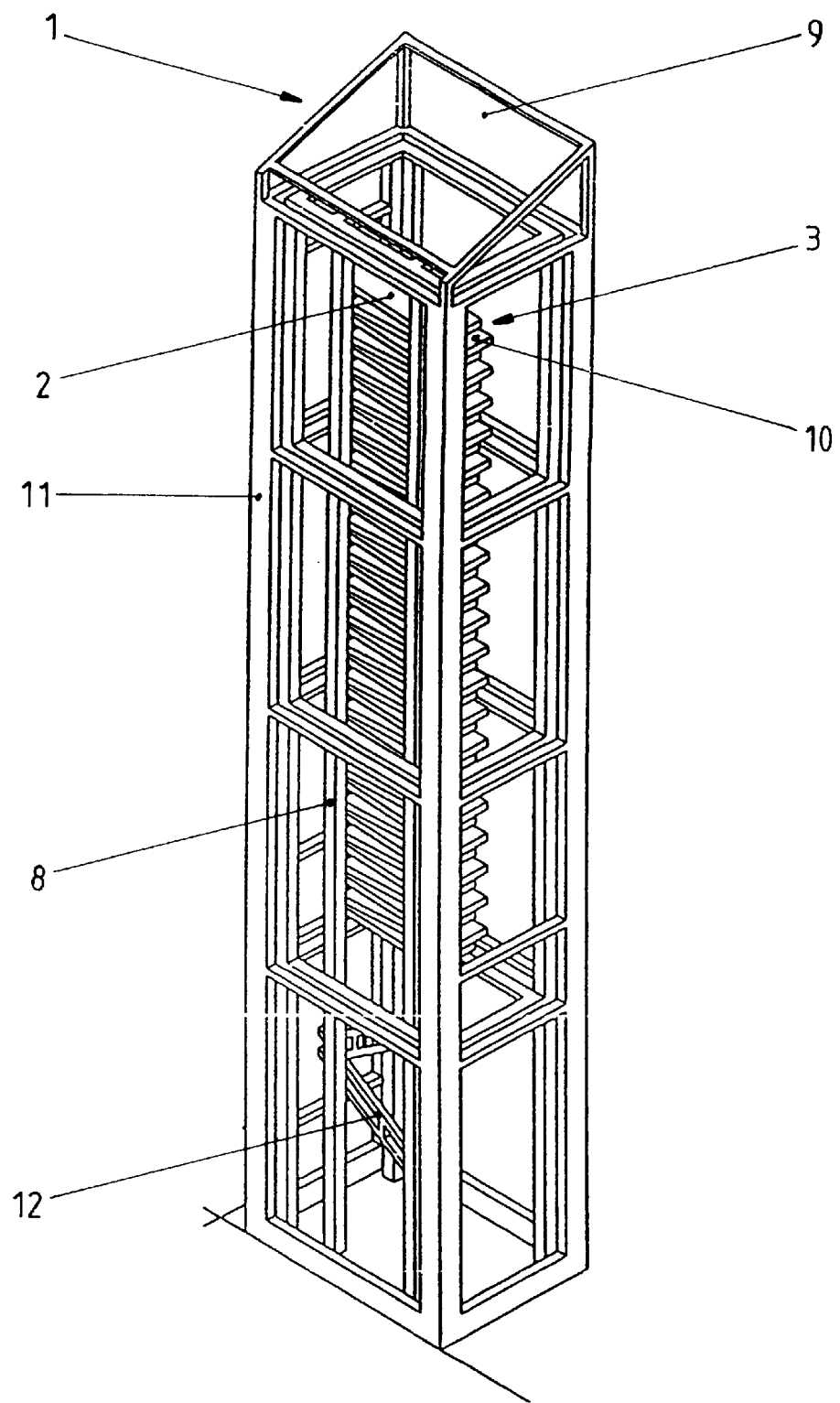
FIG. 2 is the treatment apparatus of the invention in perspective.

The treatment apparatus described in FIG. 1 is shown in perspective in FIG. 2. For clarity, the inlet and outlet spigots with the catch basin and the flow form to be inserted into the holder 12 are omitted from the figure.

Figure 3:
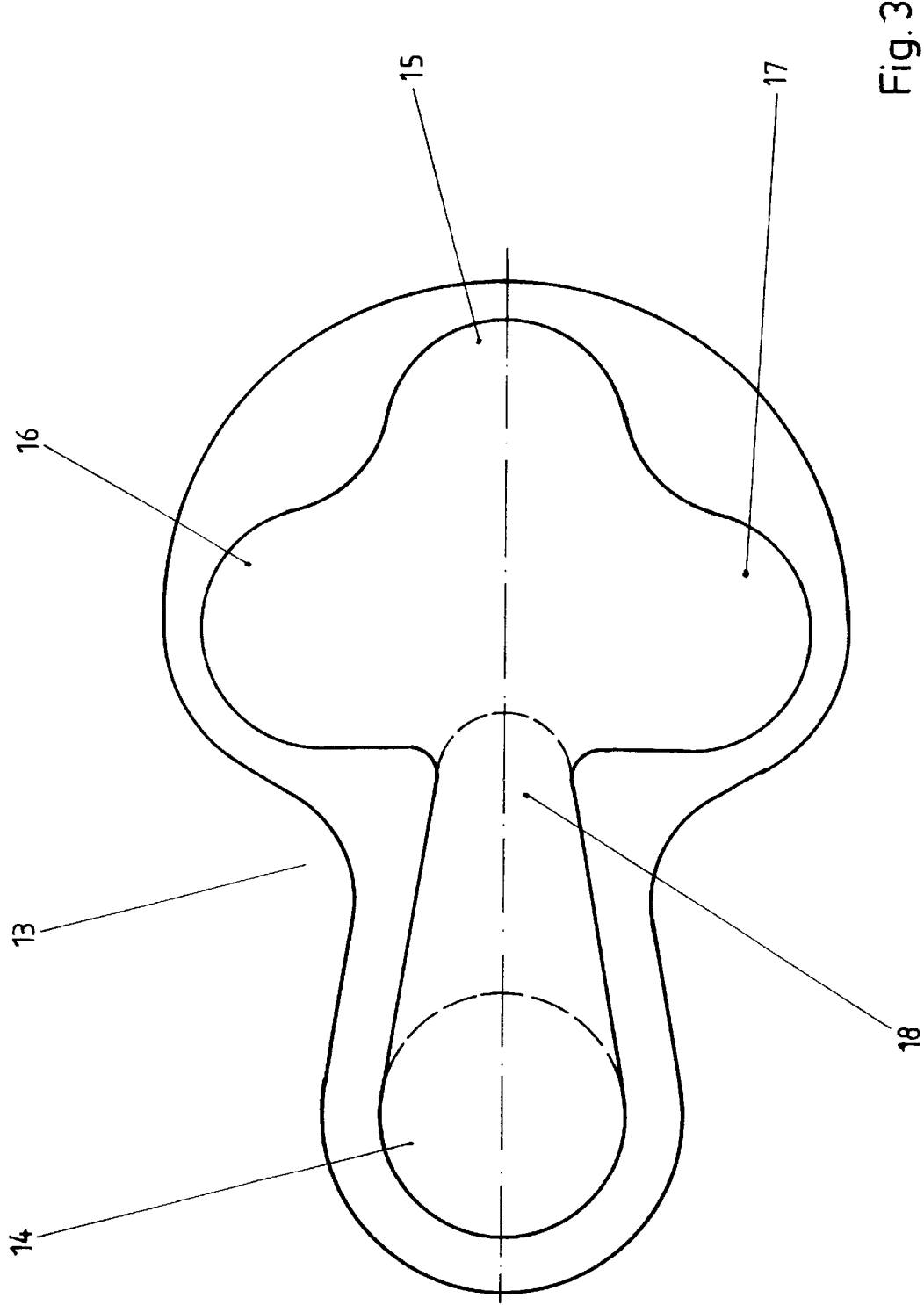
FIG. 3 is a plan view of a flow form.

FIG. 3 shows a flow form 13 in a plan view. A catch basin 14 for collecting the water is indicated. From there the water passes through a water trough 18 to two parallel swirling chambers 16 and 17 where an especially effective mixing of the water with components of air takes place. Finally the water reaches a spout 15 where the water falls free into a lower basin, not shown.

FIG. 4 shows the flow form 13 in a side view. The catch basin 14, situated at a higher level, can be seen, from which the water flows through a water trough, 18 indicated in broken lines, and falls free over the edge of the spout 15 to a lower level.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A treatment apparatus for water having a lower part, the treatment apparatus comprising:

a plurality of water troughs for the free flow of water;

a plurality of sections configured for the free fall of water, each free fall section following a water trough; and a plurality of catching systems for the water, each catching system following a free fall section and directing water into a following water trough;

wherein the plurality of water troughs, free fall sections, and catching systems are arranged such that the water reverses its direction of flow as it flows from one trough to another;

wherein the water troughs comprise a thermal energy storing material for heating said water.

2. The treatment apparatus according to claim 1, further comprising a ventilator and a housing for said ventilator and said plurality of water troughs.

3. The treatment apparatus according to claim 2, wherein the housing comprises light-admitting material.

4. The treatment apparatus according to claim 3, wherein the water troughs have a rough surface.

5. The treatment apparatus according to claim 4, wherein the water troughs are made of granite.

6. The treatment apparatus according to claim 1, further comprising flow forms disposed in the lower part of the treatment apparatus.

7. The treatment apparatus according to claim 1, wherein the water trough is open.

8. A treatment apparatus for water, the treatment apparatus comprising:

at least one water trough for the free flow of water, wherein the at least one water trough is made of granite;

at least one section configured for the free fall of water; and at least one catching system for the water;

wherein the water trough is either in front of or following the at least one section.

* * * * *